United States Patent [19]
Miyamoto et al.

[11] Patent Number: 4,678,547
[45] Date of Patent: Jul. 7, 1987

[54] ANODIZED MEMORY DISK SUBSTRATE AND METHOD OF MANUFACTURING THE SAME

[75] Inventors: Mitsuya Miyamoto, Kamakura; Yasuyuki Ooseki, Hiratsuka; Motohiro Nabae, Nikko, all of Japan

[73] Assignee: Furukawa Aluminum Co., Ltd., Tokyo, Japan

[21] Appl. No.: 903,480

[22] Filed: Sep. 4, 1986

[30] Foreign Application Priority Data
Sep. 4, 1985 [JP] Japan .................................. 60-193953

[51] Int. Cl.$^4$ .............................................. C25D 5/50
[52] U.S. Cl. .................................... 204/37.1; 204/35.1; 204/58; 365/97; 365/171; 369/288; 428/545; 428/934
[58] Field of Search ..................... 204/58, 35.1, 37.1; 428/545, 934; 369/288; 365/171, 97

[56] References Cited
U.S. PATENT DOCUMENTS
2,437,620  3/1948  Speer ..................................... 204/58

Primary Examiner—R. L. Andrews
Attorney, Agent, or Firm—Oblon, Fisher, Spivak, McClelland & Maier

[57] ABSTRACT

An anodized memory disk substrate is disclosed, which is characterized in having an anodic film having excellent heat resistance and hardness and having a thickness of not less than 3 $\mu$m on the surface of aluminum or an aluminum alloy substrate imparted thereto by means of chromic acid-sulfuric acid mixture. The method described therefor is that, after the formation of anodic film having a film thickness of not less than 4 $\mu$m on the surface of substrate, polishing is carried out so as to leave behind the anodic film having a film thickness of at least 3 $\mu$m. Heat treatment may be made before or after the polishing.

6 Claims, No Drawings

ANODIZED MEMORY DISK SUBSTRATE AND METHOD OF MANUFACTURING THE SAME

BACKGROUND OF THE INVENTION

The present invention relates to an anodized memory disk substrate and method of manufacturing the same. In particular, the invention provides the anodized memory disk substrate, wherein the rate of growth of anodic film is fast at a relatively low voltage, the hardness of film is high, and the head crush resistance and further the heat resistance are excellent.

The memory disks made from aluminum or aluminum alloy are used conventionally and so-called coated type disks, are manufactured by coating with magnetic film. Recently, with the use of high densification of the recording, processes of the plating-plating type, plating-sputtering type, anodizing-sputtering type, etc. have attracted attention. In these cases, the plating layer or the anodic film compensates for the surface hardness of the aluminum or aluminum alloy.

And, for such anodic film, three severe requests must be met:
  (a) No occurrence of cracks by heating, that is, high heat resistance.
  (b) High hardness.
  (c) No defects such as pits etc. on the surface.

The heat resistance aforementioned is necessitated at the time of the formation of thin-film magnetic recording medium, and this is because of being heated at 350° C. in order to convert $\alpha$-$Fe_2O_3$ to $\gamma$-$Fe_2O_3$ via $Fe_3O_4$.

The hardness is a principal purpose of the film. If the surface hardness is low, the substrate is dented due to the collision of magnetic head, that is, the head crush resulting in the damage of magnetic recording medium.

Moreover, if there exists defects such as surface pits etc., recording errors are generated unpreferably.

Conventional anodic film prepared using sulfuric acid is most suitable since the magnetic stability is excellent from the point of not carrying the magnetism and the corrosion resistance is also excellent as well as the hardness and the finish obtained by polishing is also good. But, it has a significant shortcoming that cracks occur by heating and, if cracks occur, innumerable recording errors are generated. For this reason, treatment methods, by which the cracks do not occur, have been investigated hitherto and the anodizing treatment in chromic acid solution was proposed (refer to, for example, Japanese Unexamined Patent Publication No. Sho 59-171023 and No. Sho 59-180832).

However, in preparing anodic film by means of chromic acid, the hardness is still insufficient and there is a difficulty in the treatment property thereof. Namely, there is a shortcoming in that the rate of growth of film is slow and, if attempting to raise the current density, high temperature and high voltage are needed and the hardness of film becomes insufficient.

As a result of intensive studies, an anodized memory disk substrate and method of manufacturing the same have now been developed by the present invention, wherein conventional shortcomings as described above are dissolved, the rate of growth of film is fast at a relatively low voltage, the anodic film has high hardness and is excellent also in the heat resistance, and further the head crush resistance is excellent from the point of hardness.

The anodizing treatment by means of only chromic acid solution is carried out most frequently hitherto as described above and is utilized for airplane members. In this case, the thickness of film is generally not more than several $\mu$m and is extremely thin. In order to make this film thicker, it is necessary to increase the current density and prolong the electrolytic time. Since the chromic acid solution aforementioned shows low electroconductivity, the solution temperature should be raised or the electrolysis should be conducted at high voltage to raise the current density. As a result of diligent studies, the inventors have found that, through treatment with a chromic acid-sulfuric acid mixture, by adding sulfuric acid to chromic acid solution, a film being thick and excellent in heat resistance and hardness is formed at relatively low temperature and low voltage in a short time. In consequence of further studies, the invention has been completed.

SUMMARY OF THE INVENTION

One aspect of the present invention pertains to an anodic film prepared by means of a chromic acid-sulfuric acid mixture on the surface of aluminum or aluminum alloy.

This anodic film is also more excellent in the heat resistance than conventional anodic film prepared using only chromic acid.

Moreover, another aspect of the present invention is a method of manufacturing the above anodized memory disk substrate, and which is characterized in that the anodizing treatment of aluminum or aluminum alloy substrate is carried out at a temperature of 30° to 90° C. at a voltage of 25 to 90 V in a mixed acid solution comprising 10 to 200 g/l of chromic acid and 0.1 to 50 g/l of sulfuric acid to form the anodic film with a film thickness of not less than 4 $\mu$m on the surface of substrate, and thereafter, polishing is carried out so as to leave behind the anodic film with a film thickness of at least 3 $\mu$m.

Another aspect of the present invention is a different method of manufacturing the above anodized memory disk substrate, and which is characterized in that the anodizing treatment of aluminum or aluminum alloy substrate is carried out at a temperature of 30° to 90° C. and a voltage of 25 to 90 V in a mixed acid solution comprising 10 to 200 g/l of chromic acid and 0.1 to 50 g/l of sulfuric acid to form the anodic film with a film thickness of not less than 4 $\mu$m on the surface of substrate, thereafter, polishing is carried out so as to leave behind the anodic film with a film thickness of at least 3 $\mu$m, and, before or after the polishing, heating is made for not less than 10 minutes at 150° to 450° C.

Through such manufacture, the hardness of the anodic film can be made higher than that by the manufacturing method aforementioned.

DETAILED DESCRIPTION OF THE INVENTION

In the invention, the anodizing treatment of aluminum or aluminum alloy substrate is carried out in a mixed acid solution of 10 to 200 g/l of chromic acid with 0.1 to 50 g/l of sulfuric acid as described above. The electrolytic temperature is preferably 30° to 90° C. and the electrolysis is preferably conducted by the direct current-constant voltage system, where the electrolytic voltage is 25 to 90 V.

In the anodizing treatment of the invention, the reason why the concentration of chromic acid is 10 to 200 g/l is because, if the concentration is under 10 g/l, so-called burning is apt to occur in anodizing and, if over 200 g/l, not only do the above advantages disappear but also the loss of CrO3 is increased to become inconvenient. It is more preferable to make the concentration 30 to 150 g/l. Moreover, the reason why the concentration of sulfuric acid is 0.1 to 50 g/l is because, if the concentration is under 0.1 g/l, the effect of enhancing the electroconductivity of solution cannot be obtained and, if over 50 g/l, the heat resistance being a characteristic of the original chromic acid film is injured. It is more preferable to make the concentration of sulfuric acid 0.5 to 10 g/l.

The reason why the electrolytic temperature is 30° to 90° C. is because, if the temperature is under 30° C., the heat resistance of film is injured and, if over 90° C., the hardness of the film is lowered. Furthermore, the reason why the electrolytic voltage is 25 to 90 V is because, if the voltage is under 25 V, the heat resistance of the film is injured and, if over 90 V, the hardness of film is lowered.

Next, the reason why, after the anodic film is formed in a thickness not less than 4 μm by carrying out the designated electrolysis, and polishing is carried out and the thickness of film after the polishing was made not less than 3 μm is because, if the thickness of film after the polishing is under 3 μm, the head crush resistance is poor and, in order to make the film thickness after the polishing not less than 3 μm, the thickness of anodic film formed through the designated electrolysis must be not less than 4 μm and, if less than 4 μm, the margin to polish up cannot be taken sufficiently at the time of the polishing to leave a problem in the smoothness after the polishing.

Moreover, the reason why, after the formation of the anodic film through the designated electrolysis, polishing is carried out and, before or after it, heating is made for not less than 10 minutes at 150° to 450° C. is due to that the adsorbed water onto the anodic film is allowed to dehydrate to increase the hardness of film more, and the reason why the heating conditions were confined as above is due to that, if the heating temperature is under 150° C., there is no effect sufficient to allow the adsorbed water to dehydrate, however long the time may be, and, if over 450° C., the adsorbed water dehydrates but the cracks occur in the film because of the high temperature. Less effect is exerted when the heating time is under 10 minutes.

EXAMPLE 1

Using aluminum alloy for memory disk (JIS A5086) having an outer diameter of 210 mm, an inner diameter of 100 mm and a thickness of 1.9 mm, the surface was processed mirrorlike. Then, this was dipped into trichloroethylene to degrease and the anodizing treatments shown in Table 1 were given to this. With these, the surface was polished by polishing, washed with water and dried to manufacture the anodized memory disk substrates.

Of these substrates, the heat resistance and the hardness were determined. The results are put in Table 1 together.

Besides, for the judgment of heat resistance, heating was made for 2 hours at 400° C. and the occurrence of cracks in the film was observed. Thereby, one without cracks was marked by O and one with cracks occurred by X. Moreover, as the hardness, the hardness of section of film was measured by the use of Micro Vickers Hardness tester.

TABLE 1

|  | No. | Concentration (g/l) CrO3 | Concentration (g/l) H2SO4 | Temperature (°C.) | Electrolytic voltage (V) | Electrolytic time (min) | Thickness of anodic film (μm) After formation of anodic film | Thickness of anodic film (μm) After polishing | Characteristics Heat resistance | Characteristics Hardness |
|---|---|---|---|---|---|---|---|---|---|---|
| The invention | 1 | 15 | 0.2 | 85 | 55 | 45 | 11 | 9 | O | 380 |
| " | 2 | 20 | 8.0 | 50 | 75 | 50 | 16 | 13 | O | 410 |
| " | 3 | 20 | 2.5 | 75 | 85 | 25 | 9 | 8 | O | 390 |
| " | 4 | 180 | 0.3 | 80 | 85 | 45 | 17 | 12 | O | 390 |
| " | 5 | 150 | 9.0 | 45 | 60 | 60 | 16 | 14 | O | 400 |
| " | 6 | 175 | 1.5 | 60 | 60 | 40 | 10 | 8 | O | 410 |
| " | 7 | 50 | 1.0 | 80 | 75 | 35 | 11 | 9 | O | 410 |
| " | 8 | 100 | 7.5 | 50 | 75 | 35 | 11 | 10 | O | 385 |
| " | 9 | 75 | 5.0 | 60 | 80 | 30 | 10 | 8 | O | 400 |
| " | 10 | 50 | 50 | 40 | 25 | 30 | 5 | 3 | O | 340 |
| " | 11 | 100 | 10 | 40 | 30 | 60 | 8 | 6 | O | 360 |
| " | 12 | 100 | 50 | 30 | 25 | 60 | 10 | 8 | O | 370 |
| " | 13 | 200 | 5.0 | 40 | 40 | 15 | 4 | 3 | O | 330 |
| Comparison | 14 | 5 | 3.0 | 60 | 80 | 45 | 16 | 13 | Poor surface state | |
| " | 15 | 50 | — | 75 | 60 | 80 | 12 | 10 | O | 220 |
| " | 16 | 100 | 0.05 | 50 | 60 | 70 | 13 | 10 | O | 250 |
| " | 17 | 150 | 1.5 | 95 | 70 | 20 | 6 | 4 | O | 215 |
| " | 18 | 50 | 0.5 | 20 | 80 | 40 | 14 | 12 | X | 390 |
| " | 19 | 100 | 2.0 | 75 | 100 | 10 | 4 | 3 | O | 220 |
| " | 20 | 25 | 1.0 | 60 | 20 | 30 | 5 | 3 | X | 400 |

As evident from Table 1, it can be seen that the substrates for memory disk No. 1 through 13 manufactured by the method of the invention have good heat resistance and excellent hardness of film of as high as 330 to 410.

Whereas, in the cases of the method of comparison wherein the conditions are out of those prescribed the method of the invention, either heat resistance or hardness of film is inferior. Namely, in the case of comparative method No. 14 wherein the concentration of chromic acid is low, the surface state becomes poor and, in the cases of comparative method No. 15 and 16 wherein the concentration of sulfuric acid is low, in the case of comparative method No. 17 wherein the electrolytic temperature is high and in the case of comparation method No. 19 wherein the electrolytic voltage is high, the hardness of film is low in all cases. In the case of comparative method No. 18 wherein the electrolytic temperature is low and in the case of comparative method No. 20 wherein the electrolytic voltage is low, the heat resistance is seen to be inferior in either case.

EXAMPLE 2

Using aluminum alloy for memory disk (JIS A5086) having an outer diameter of 210 mm, an inner diameter of 100 mm and a thickness of 1.9 mm, the surface was processed mirrorlike. Then, this was dipped into trichloroethylene to degrease and the anodizing treatment was carried out for 35 minutes at a temperature of 60° C. and a voltage of 75 V in a mixed acid solution comprising 50 g/l of chromic acid and 0.75 g/l of sulfuric acid to form the film with a thickness of 11 μm. After washed with water and dried, the heat treatments were carried out under the conditions shown in Table 2. Following this, the surface was polished by polishing, washed with water and dried to manufacture the anodized memory disk substrates. Of these substrates, the hardness of film was determined similarly to Example 1. The results are shown in Table 2.

TABLE 2

| Manufacturing method | No. | Heating conditions | | Hardness of film |
|---|---|---|---|---|
| | | Temperature (°C.) | Time (min) | |
| The invention | 21 | 200 | 30 | 435 |
| The invention | 22 | 250 | 90 | 440 |
| The invention | 23 | 400 | 10 | 450 |
| The invention | 24 | 350 | 60 | 440 |
| The invention | 25 | 150 | 120 | 430 |
| Comparison | 26 | No heating | | 410 |
| Comparison | 27 | 100 | 20 | 415 |
| Comparison | 28 | 200 | 5 | 415 |
| Comparison | 29 | 500 | 10 | Frequent occurrence of cracks |

As evident from Table 2, it can be seen that, with ones by the method of the invention No. 21 through 25 wherein heating was made for not less than 10 minutes at 150° to 450° C. after the anodizing treatment, the hardness of film is improved further.

As described, according to the invention, the anodized memory disk substrate can be provided, wherein conventional shortcomings of the magnetic disk substrate are dissolved, the rate of growth of film is fast at a relatively low voltage, the hardness of film is high, and the head crush resistance and also the heat resistance are excellent. Therefore, the invention exerts remarkable effects.

What is claimed is:

1. An anodized memory disk substrate having an anodic film thereon which has excellent hardness and heat resistance, said film having a thickness of not less than 3 μm, and said anodized memory disk being produced by the process of:
   (a) anodizing a substrate of aluminum or aluminum alloy at a temperature of from 30° to 90° C. and at a voltage of from 25 to 90 V in a mixed acid solution comprising 10 to 200 g/l of chromic acid and 0.1 to 50 g/l of sulfuric acid to form the anodic film having a film thickness of not less than 4 μm on the surface of the substrate,
   (b) polishing said anodized substrate so as to leave behind the anodic film with a film thickness of at least 3 μm, and before or after said polishing,
   (c) heating said anodized substrate for not less than 10 minutes at a temperature in the range of 150° to 450° C.

2. A method of manufacturing an anodized memory disk substrate having an anodic film thereon which has excellent hardness and heat resistance, said film having a thickness of not less than 3 μm, said method comprising:
   (a) anodizing a substrate of aluminum or aluminum alloy at a temperature of from 30° to 90° C. and at a voltage of from 25 to 90 V in a mixed acid solution comprising 10 to 200 g/l of chromic acid and 0.1 to 50 g/l of sulfuric acid to form the anodic film having a film thickness of not less than 4 μm on the surface of the substrate,
   (b) polishing said anodized substrate so as to leave behind the anodic film with a film thickness of at least 3 μm, and before or after said polishing, and
   (c) heating said anodized substrate for not less than 10 minutes at a temperature in the range of 150° to 450° C.

3. The anodized memory disk substrate of claim 1, wherein said mixed acid solution comprises 30 to 150 g/l of chromic acid and 0.5 to 10 g/l of sulfuric acid.

4. The anodized memory disk substrate of claim 1, wherein said anodized substrate is heated at 150°-400° C. for 10-120 minutes.

5. The method of claim 2, wherein said mixed acid solution comprises 30 to 150 g/l of chromic acid and 0.5 to 10 g/l of sulfuric acid.

6. The method of claim 2, wherein said anodized substrate is heated at 150°-400° C. for 10-120 minutes.

* * * * *